United States Patent Office 2,732,392
Patented Jan. 24, 1956

2,732,392

PRODUCTION OF ISOCYANATES FROM ISOCYANIC ACID AND AMINES OR AMINE HYDROHALIDES

James H. Saunders and William B. Bennet, Anniston, Ala., assignors to Monsanto Chemical Company, St. Louis, Mo., a corporation of Delaware No Drawing. Application January 8, 1953, Serial No. 330,364

18 Claims. (Cl. 260—453)

The present invention is directed to monocarbamyl halides and isocyanic acid esters and to an improved method of producing same.

An object of the invention is to provide an economically and commercially feasible method of making monocarbamyl halides and isocyanic acid esters in good yields.

Another object of the invention is to provide a method of making monocarbamyl halides and isocyanic acid esters from readily available starting materials.

A further object of the invention is to provide a method of making monocarbamyl halides and isocyanic acid esters without the use of phosgene, thus overcoming the disadvantages which accompany the use of this gas.

A still further object of the invention is to provide a continuous method of producing monocarbamyl halides and isocyanic acid esters from hydrogen halides, amines or amine hydrohalides and isocyanic acid or compounds which decompose into isocyanic acid under the reactive conditions of the method.

Other objects and advantages will be apparent to those skilled in the art as the description of the invention proceeds.

In accordance with the instant invention, the above objects are accomplished by reacting together, in the vapor phase, a primary organic amine or amine hydrohalide, isocyanic acid and a hydrogen halide in accordance with the following equations:

$$RNH_2 + HNCO + HX \rightarrow RNCO + NH_4X$$

$$RNH_2 + HNCO + 2HX \rightarrow RNHCOX + NH_4X$$

wherein R is an organic radical and X is a halogen atom, preferably chlorine and bromine.

In place of isocyanic acid, substances which decompose into this compound under the reactive conditions of the method may be employed. Illustrative examples of these are urea, cyanuric acid and biuret, etc. These materials decompose into isocyanic acid in accordance with the following equations:

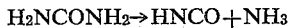

$$H_2NCONH_2 \rightarrow HNCO + NH_3$$

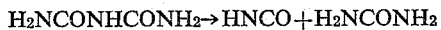

$$H_2NCONHCONH_2 \rightarrow HNCO + H_2NCONH_2$$

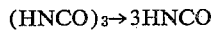

$$(HNCO)_3 \rightarrow 3HNCO$$

In the first group of reactions, the product recovered may be the monocarbamyl halide or the corresponding isocyanic acid ester, depending upon the amount of hydrogen halide employed and upon the method and conditions used in treating the gaseous or vaporous reaction products. For example, if hydrogen halide is employed only in an amount sufficient to react with the by-product ammonia and the unreacted amine, then only the free isocyanic acid ester will be obtained. On the other hand, if the amount of hydrogen halide used is in excess of that required to react with the ammonia and the unreacted amine, then part or all of the isocyanic acid ester is converted, on condensation of the gaseous or vaporous product, into the corresponding carbamyl halide. However, if hydrogen halide in excess of that required to form ammonium halide and react with the unreacted amine is separated from the gaseous or vaporous product at a temperature or under conditions avoiding substantial combination of the ester with the hydrogen halide, then the isocyanic acid ester is recovered.

The separation of the isocyanic acid esters from the unreacted hydrogen halide is accomplished by physical and/or chemical means, and the most practical method to use varies with the isocyanic acid ester produced. Thus, if the isocyanic acid ester boils above the decomposition temperature of the corresponding carbamyl halide, the separation may be advantageously effected by chemical or physical means such as by condensing or scrubbing the esters from the reaction products at a temperature above that at which the carbamyl halide dissociates to hydrogen halide and isocyanate. If the isocyanic acid ester boils in the range of or below the carbamyl halide decomposition temperature, then chemical methods of separation are the more practical ones to use, but physical methods of separation are also within the scope of the invention. In either event, it is essential to make the separation at a temperature corresponding to or above the decomposition point of the carbamyl halide, otherwise this compound or mixtures thereof with isocyanic acid esters are formed.

For a more complete understanding of the present invention, reference is made to the following illustrative examples. The parts are by weight.

EXAMPLE I

*α-Naphthyl carbamyl chloride*

The apparatus employed in this embodiment of the invention included a tubular reactor, a receiver partially filled with toluene, a packed tower mounted on the receiver and communicating therewith, and a recycle line including a centrifugal pump for withdrawing toluene from the receiver and pumping it into the top of the packed tower so that the solvent could scrub the gaseous or vaporous reaction product. The scrubbing solvent thus enriched was then returned to the receiver to be continuously recycled to the scrubbing tower and the uncondensed gases were discharged from the system by an exhaust gas line which was attached to the top of the above tower.

The tubular reactor consisted of an electrically heated Pyrex glass tube which was 1 inch in diameter and 18 inches in length. About 2 inches from the feed end of the reactor, there was provided an inlet tube for introducing nitrogen and a mixture of cyanuric acid and α-naphthylamine, and about 5 inches from the same end, the reactor was equipped with an inlet tube for introducing hydrogen chloride so that it would react with the vaporized mixture. Moreover, the reactor was provided with a thermometer which extended from the feed end of the reactor to a point just beyond the hydrogen chloride inlet tube so that the reaction temperature could be measured. In addition, in the reactor and beyond the end of the thermometer, Berl Saddles were introduced so as to facilitate intimate mixing of the reactants. Finally, the exit end of the reactor was directly connected to the toluene-containing receiver in such a manner that the gaseous or vaporous product was passed over the surface of the toluene and conducted into the packed tower where it was treated with a countercurrent stream of the recycled toluene.

Nitrogen under slight pressure was introduced along with the mixture of cyanuric acid and α-naphthylamine so as to facilitate the mixing of the latter with the hydrogen chloride and also to prevent the hydrogen chloride from flowing in the direction of the inlet tube for the above mixture, which was found to cause side reactions and a reduction in the yield of the desired product.

DESCRIPTION OF THE METHOD 23.2 parts of a mixture of cyanuric acid and α-naphthylamine in an equivalent ratio of 1.2:1, nitrogen and an excess of hydrogen chloride were introduced into the above reactor over a period of 1 hour, during which time the reaction temperature was maintained within the range of about 415° C. to about 425° C. The effluent gases and solids from the reactor were passed into the scrubbing tower where the α-naphthylamine-cyanuric acid reaction product, α-naphthylamine hydrochloride, ammonium chloride and unreacted cyanuric acid were recovered by scrubbing with toluene. The gaseous residue including nitrogen and hydrogen chloride was discharged from the system.

The resulting toluene slurry was filtered to remove its solids content which included unreacted cyanuric acid, ammonium chloride and α-naphthylamine hydrochloride. Upon completing this operation, the filtrate was reacted with aniline to form N-phenyl-N'-α-naphthylurea which showed that the amine had been converted into the corresponding carbamyl chloride.

EXAMPLE II

α-Naphthyl carbamyl chloride

The procedure described in Example I was followed, using a reaction temperature of about 350° C. to about 370° C. and a mixture of 16.5 parts of α-naphthylamine and 8.4 parts of urea in place of the α-naphthylamine-cyanuric acid mixture.

The toluene slurry thus obtained was filtered to remove its solids content and the filtrate treated with aniline. 5.2 parts of α-naphthylamine as the hydrochloride and 9 parts of N-phenyl-N'-α-naphthylurea were recovered, thus showing that the yield of the carbamyl chloride corresponded to about 44% of theory, basis α-naphthylamine consumed.

EXAMPLE III

α-Naphthyl carbamyl chloride

The preceding example was repeated, using a mixture of 24.9 parts of α-naphthylamine hydrochloride and 10.1 parts of urea, an excess of hydrogen chloride gas and a reaction time of 3½ hours.

The resulting toluene slurry was filtered and the filtrate reacted with aniline. N-phenyl-N'-α-naphthylurea was obtained in a yield slightly less than that obtained in Example II.

In a similar manner, phenyl carbamyl chloride, cyclohexyl carbamyl chloride and ethyl carbamyl chloride were obtained in good yield using the following materials and conditions.

| Materials | Reaction Temperature, ° C. | Time of Run, Hours | Product |
|---|---|---|---|
| (7.4 parts of urea, 13.3 parts of aniline hydrochloride). | 350-370 | 1 | Phenyl carbamyl chloride. |
| (25.4 parts of urea, 47.5 parts of cyclohexylamine hydrochloride). | 350-370 | 3 | Cyclohexyl carbamyl chloride. |
| (23.8 parts of urea, 26.9 parts of ethyl amine hydrochloride). | 370-380 | 1 | Ethyl carbamyl chloride. |

In the production of monocarbamyl halides and the corresponding isocyanic acid esters in accordance with the present invention, isocyanic acid, a primary organic amine or amine hydrohalide and a hydrogen halide are reacted together, in the vapor phase, to form a vaporous product containing the corresponding isocyanate, ammonia, unreacted amine, and unreacted hydrogen halide. The isocyanate content of this vaporous product is recovered by separating same therefrom under conditions avoiding chemical combination with the unreacted hydrogen halide. If the corresponding carbamyl halide is desired, then the isocyanate is separated from the vaporous product under conditions permitting the chemical union of the isocyanate with the unreacted hydrogen halide.

The isocyanic acid and the amine or amine hydrohalide are employed in a molar ratio of the first to the second reactant, which may vary within the range of about 1.0 to about 8.0 and preferably within the range of about 1.0 to about 1.5. Where compounds decomposing into isocyanic acid are substituted for isocyanic acid, they are reacted with the amine or amine hydrohalide in molar ratios which are chemically equivalent to those stated above.

The hydrogen halide is employed in an amount at least sufficient to convert the by-product ammonia and unreacted amine into the corresponding halides when the isocyanate is the desired end product. Where the carbamyl halide is desired, the hydrogen halide is employed in an amount at least sufficient to also convert the isocyanic acid ester into the corresponding carbamyl halide. The hydrogen halide may be supplied as such to the reaction, by decomposing the hydrohalide salt or by both of these means.

The reaction is carried out at a temperature sufficiently high to convert the reactants into the vapor phase up to that temperature avoiding substantial decomposition of the isocyanic acid ester produced. More particularly, the reaction is carried out at a temperature within the range of about 300° C. to about 500° C. and preferably within the range of about 350° C. to about 450° C.

The product of the vapor phase reaction between isocyanic acid or a compound decomposable into isocyanic acid, a primary organic amine or amine hydrohalide and a hydrogen halide is a gaseous or vaporous mixture containing the corresponding isocyanic acid ester. If the hydrogen halide is used in an amount exceeding that required to react with the by-product ammonia and unreacted amine, the isocyanic acid ester and the excess hydrogen halide react at temperatures below about 60° C. to about 100° C. to produce the corresponding monocarbamyl halide. Therefore, if the isocyanate is desired, it is essential that the excess hydrogen halide be separated from the isocyanate at a temperature at which substantial combination is avoided. Stated in other words, this separation should be effected at a temperature above 90° C. but below the boiling point of the isocyanic acid ester or, preferably, at a temperature above 90° C. but not above about 120° C. However, if the hydrogen halide is employed only in an amount sufficient to react with the by-product ammonia and unreacted amine, no excess hydrogen halide will be present in the gaseous or vaporous mixture, in which case the isocyanate will be recovered directly. The mixture of ammonium halide, amine hydrohalide and isocyanate thus obtained is desirably separated by one of the following methods.

One method involves passing the gaseous or vaporous reaction product into a solid entrainment separator, e. g., a cyclone separator operated at a temperature such that the solid ammonium halide and amine hydrohalide are separated and the isocyanate is passed on with the gas stream. This gas stream is further cooled and scrubbed with toluene or another suitable solvent to effect a recovery of the isocyanate.

Another method comprises collecting the solid ammonium halide and amine hydrohalide and isocyanate in toluene, hexane or another suitable selective solvent for the isocyanate, filtering to remove the solid material and then distilling to separate the isocyanate from the solvent.

The isocyanic acid esters containing from 2 to 5 carbon atoms per mol boil in the range of or below the carbamyl halide decomposition temperature and may be separated from hydrogen halide by scrubbing with a tertiary amine or a solution thereof in an inert organic solvent for the ester such as chlorobenzene, xylene, toluene, orthodichlorobenzene, 1,2,4-trichlorobenzene, kerosene, cyclohexane, carbon tetrachloride, hexahydrobenzene, ligroin, petroleum, etc. The separation of the above esters from the hydrogen halide may also be effected by adsorbing the hydrogen halide in an adsorbent or any of the well-known means for physically separating the above gas from gaseous products containing same.

The isocyanic acid esters containing at least 6 carbon atoms per mol boil above the decomposition temperature of the corresponding carbamyl halide and may be readily separated by condensing and/or scrubbing the esters from the reaction product at a temperature above the decomposition temperature of the corresponding carbamyl halide, but other well-known physical methods of separating these esters from gases containing same are also within the scope of the invention.

If desired, the isocyanic acid or compound decomposing into isocyanic acid, the primary organic amine or amine hydrohalide and hydrogen halide may be reacted together in the vapor phase and in the proportions required to form a vaporous or gaseous mixture of isocyanic acid ester, ammonium halide, amine hydrohalide and unreacted hydrogen halide, which product is then permitted to condense so as to recover the corresponding carbamyl halide by chemical union of the ester with the unreacted hydrogen halide. The carbamyl halide may then be converted into the corresponding isocyanate and the method employed for this purpose is dependent upon the relationship between the boiling point of the isocyanate and the decomposition temperature of the carbamyl halide. If the boiling point of the isocyanate is above the decomposition temperature of the carbamyl halide, then the conversion may be carried out thermally without a dehydrohalogenation agent. On the other hand, if the boiling point of the isocyanate is below the decomposition temperature of the carbamyl halide, then a dehydrohalogenation agent is required. In either event, however, a dehydrohalogenation agent may be employed.

Where the monocarbamyl halide is the desired end product, it may be recovered from the gaseous reaction product by any one of the procedures described in Patent No. 2,480,088 to Robert J. Slocombe and Edgar E. Hardy.

The present invention is applicable generally to the production of monocarbamyl halides and isocyanic acid esters by the reaction of isocyanic acid with organic primary amines or their corresponding hydrohalides and hydrogen halides. As indicated earlier herein, compounds such as urea, biuret, cyanuric acid, etc. which decompose under the reactive conditions of the method into isocyanic acid may be employed in place of isocyanic acid per se. Illustrative classes of organic amines and amine hydrohalides within the scope of the invention are primary aryl-, aralkyl-, alkaryl-, alkyl- and cycloalkyl amines, substituted derivatives thereof and the corresponding hydrohalides. Substituted derivatives include primary amines and amine hydrohalides substituted by halogen-, alkoxy-, acyl-, nitro and other radicals which do not react with hydrogen halides or isocyanic acid esters. Typical examples of amines within these broad classes are aniline, m-chloroaniline, naphthylamine, ar-tetrahydro-α-naphthylamine; benzylamine, phenylethylamine, tolylamine, C-dimethylaniline; methyl-, ethyl-, propyl-, isopropyl-, butyl- amines, etc.; cyclohexylamine, ac-tetrahydro-β-naphthylamine; p-chloroaniline, p-bromoaniline, methoxyaniline; nitroaniline; and p-aminoacetophenone, etc.

The separation of the monocarbamyl halide or the corresponding isocyanic acid ester from the reaction product may be effected in any convenient manner and the invention is not limited to the recovery methods herein specifically described. It is to be understood that various modifications may be practiced without departing from the spirit and scope of the invention as defined in the appended claims.

Where reference is made in the claims to "reacting, in the vapor phase, a material selected from the group consisting of isocyanic acid and compounds decomposing into isocyanic acid," it is to be understood that the last-mentioned compounds are not present as such in the vapor phase but that their decomposition products including isocyanic acid are in such a physical state.

What we claim is:

1. The method of preparing monocarbamyl halides and the corresponding isocyanic acid esters, which comprises reacting together, in the vapor phase, a material selected from the group consisting of isocyanic acid and compounds decomposing into isocyanic acid, a compound selected from the group consisting of organic primary amines and their hydrogen halide salts, and a hydrogen halide, said first two reactants being employed in a molar ratio of the first reactant, basis isocyanic acid, to the second of about 1.0 to about 8.0, said third reactant being employed in an amount varying from about 1 equivalent up to substantially in excess of that stoichiometrically required to convert the product of the reaction into the corresponding carbamyl halide and said reaction being carried out at a temperature sufficiently high to convert said reactants into the vapor phase but below that temperature at which substantial decomposition of the resulting isocyanic acid esters takes place.

2. The method of preparing monocarbamyl chlorides and the corresponding isocyanic acid esters, which comprises reacting together, in the vapor phase, a material selected from the group consisting of isocyanic acid and compounds decomposing into isocyanic acid, a compound selected from the group consisting of organic primary amines and the hydrogen chloride salts, and hydrogen chloride, said first two reactants being employed in a molar ratio of the first reactant, basis isocyanic acid, to the second of about 1.0 to about 1.5, said third reactant being employed in an amount varying from about 1 equivalent up to substantially in excess of that stoichiometrically required to convert the product of the reaction into the corresponding carbamyl chloride and said reaction being carried out at a temperature sufficiently high to convert said reactants into the vapor phase but below that temperature at which substantial decomposition of the resulting isocyanic acid esters takes place.

3. The method of preparing monocarbamyl chlorides and the corresponding isocyanic acid esters, which comprises reacting together, in the vapor phase, isocyanic acid, a compound selected from the group consisting of organic primary amines and their hydrogen chloride salts, and hydrogen chloride, said reactants being employed in substantially the molar ratios stoichiometrically required to form said carbamyl chlorides and said isocyanic acid esters and said reaction being carried out at a temperature sufficiently high to convert said reactants into the vapor phase but below that temperature at which substantial decomposition of the resulting isocyanic acid esters takes place.

4. The method defined in claim 2, in which the material decomposing into isocyanic acid is cyanuric acid.

5. The method defined in claim 2, in which the material decomposing into isocyanic acid is biuret.

6. The method defined in claim 2, in which the material decomposing into isocyanic acid is urea.

7. The method of preparing monocarbamyl chlorides which comprises reacting together, in the vapor phase and at a temperature within the range of about 300° C. to about 500° C., a compound decomposing into isocyanic acid at said temperature, a compound selected from the group consisting of organic primary amines and their hydrogen chloride salts, and hydrogen chloride, said reactants being employed in substantially the molar ratios stoichiometrically required to form said carbamyl chlorides.

8. The method of preparing monocarbamyl chlorides which comprises reacting together, in the vapor phase and at a temperature within the range of about 350° C. to about 450° C., a compound decomposing into isocyanic acid at said temperature, a compound selected from the group consisting of organic primary amines and their hydrogen chloride salts, and hydrogen chloride, said reactants being employed in substantially the molar ratios stoichiometrically required to form said carbamyl chloride.

9. The method of preparing α-naphthyl carbamyl chloride, which comprises reacting together, in the vapor phase and at a temperature within the range of about 300° C. to about 500° C., cyanuric acid, α-naphthylamine and hydrogen chloride, to form a vaporous product containing α-naphthyl isocyanate and unreacted hydrogen chloride and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

10. The method of preparing α-naphthyl carbamyl chloride, which comprises reacting together, in the vapor phase and at a temperature within the range of about 300° C. to about 500° C., urea, α-naphthylamine, and hydrogen chloride to form a vaporous product containing α-naphthyl isocyanate and unreacted hydrogen chloride and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

11. The method of preparing α-naphthyl carbamyl chloride, which comprises reacting together, in the vapor phase and at a temperature within the range of about 300° C. to about 500° C., urea, α-naphthylamine hydrochloride and hydrogen chloride, to form a vaporous product containing α-naphthyl isocyanate and unreacted hydrogen chloride and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

12. The method of producing phenyl carbamyl chloride, which comprises reacting together, in the vapor phase and at a temperature within the range of about 350° C. to about 370° C., urea aniline and hydrogen chloride, to form a vaporous product containing phenyl isocyanate and unreacted hydrogen chloride and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

13. The method of preparing cyclohexyl carbamyl chloride, which comprises reacting together, in the vapor phase and at a temperature of from about 350° to about 370° C., urea, cyclohexylamine and hydrogen chloride, to form a vaporous product containing cyclohexyl isocyanate and unreacted hydrogen chloride, and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

14. The method of preparing ethyl carbamyl chloride, which comprises reacting together, in the vapor phase and at a temperature within the range of about 370° C. to about 380° C., urea, ethylamine and hydrogen chloride, to form a vaporous product containing ethyl isocyanate and unreacted hydrogen chloride and condensing said vaporous product to recover the corresponding carbamyl chloride by chemical union of said isocyanate with said unreacted hydrogen chloride, said reactants being employed in substantially the molar ratios stoichiometrically required to form said carbamyl chloride.

15. The method of preparing isocyanic acid esters, which comprises reacting together, in the vapor phase, a material selected from the group consisting of isocyanic acid and compounds decomposing into isocyanic acid, a compound selected from the group consisting of organic primary amines and their hydrogen halide salts, and a hydrogen halide, said reactants being employed in at least the molar ratios stoichiometrically required to form said isocyanic acid esters and said reaction being carried out at a temperature sufficiently high to convert said reactants into the vapor phase but below that temperature at which substantial decomposition of the resulting isocyanic acid ester takes place.

16. The method of preparing isocyanic acid esters, which comprises reacting together, in the vapor phase, a material selected from the group consisting of isocyanic acid and compounds decomposing into isocyanic acid, a compound selected from the group consisting of organic primary amines and their hydrogen halide salts, and a hydrogen halide, to form a vaporous product containing the corresponding isocyanate and unreacted hydrogen halide and separating said isocyanate from said vaporous product under conditions preventing recombination of said unreacted halide with said isocyanate, said reactants being employed in substantially the molar ratios stoichiometrically required to produce said isocyanate and said reaction being carried out at a temperature sufficiently high to convert said reactants into the vapor phase but below that temperature at which substantial decomposition of the resulting isocyanic acid ester takes place.

17. The method of preparing isocyanic acid esters containing at least 6 carbon atoms, which comprises reacting together, in the vapor phase and at a temperature within the range of about 300° C. to about 500° C., a material selected from the group consisting of isocyanic acid and compounds decomposing into isocyanic acid at said temperature, a compound selected from the group consisting of organic primary amines and their hydrogen halide salts, and hydrogen halide, to form a vaporous product containing an isocyanate having at least 6 carbon atoms and separating said ester by condensing same from said product at a temperature above that at which substantial combination with the unreacted hydrogen chloride occurs, said first two reactants being employed in a molar ratio of the first reactant, basis isocyanic acid, to the second of about 1.0 to about 8.0, said third reactant being employed in an amount varying from about 1 equivalent up to substantially in excess of that stoichiometrically required to convert the product of the reaction into the corresponding carbamyl halide and said reaction being carried out at a temperature sufficiently high to convert said reactants into the vapor phase but below that temperature at which substantial decomposition of the resulting isocyanic acid ester takes place.

18. The method of preparing isocyanic acid esters containing not more than 5 carbon atoms, which comprises reacting together, in the vapor phase and at a temperature within the range of about 300° C. to about 500° C., a material selected from the group consisting of isocyanic acid and compounds decomposing into isocyanic acid at said temperature, a compound selected from the group consisting of organic primary amines and their hydrogen halide salts, and hydrogen halide, to form a vaporous product containing an isocyanate having not more than 5 carbon atoms and unreacted hydrogen halide and separating said isocyanate from the unreacted hydrogen halide at a temperature above that at which substantial combination of said isocyanate with said hydrogen halide occurs, said first two reactants being employed in a molar ratio of the first reactant, basis isocyanic acid, to the second of about 1.0 to about 8.0 and said third reactant being employed in an amount varying from about 1 equivalent up to substantially in excess of that stoichiometrically required to convert the product of the reaction into the corresponding carbamyl halide.

References Cited in the file of this patent

UNITED STATES PATENTS

| | | |
|---|---|---|
| 2,409,712 | Schweitzer | Oct. 22, 1946 |
| 2,580,468 | Schaefer et al. | Jan. 1, 1952 |
| 2,611,782 | Bortnick | Sept. 23, 1952 |